United States Patent Office 3,510,447
Patented May 5, 1970

3,510,447
UNSATURATED POLYESTERS WITH ITACONIC ACID ESTERS
Pierre Bourguignon, Melle, France, assignor to Les Usines de Melle (Societe Anonyme), Melle, Deux-Sevres, France, a corporation of France
No Drawing. Filed Apr. 27, 1965, Ser. No. 451,333
Claims priority, application France, Apr. 29, 1964, 972,895
Int. Cl. C08g 39/06, 51/10
U.S. Cl. 260—40                              8 Claims

ABSTRACT OF THE DISCLOSURE

The disclosure describes polymerizable compositions containing polyenesters, lower alkyl itaconic esters, and glass fibers with the possible addition of vinyl modifiers. The compositions are such that upon curing the index of refraction of the resulting cured polymer is substantially the same as that of the glass fibers.

This invention relates to improved polyester resins, and more specifically, it relates to vinyl-modified polyester resins which are reinforced with glass fibers.

Unsaturated polyester resins which are cross-linked with unsaturated materials such as vinyl derivatives are known in the art. See for example, Golding, Polymers and Resins, 1959. New York, Van Nostrand. The esters are produced either by reacting an unsaturated glycol (polyol or polyhydroxy compound) with a saturated dicarboxylic acid or by reacting a saturated glycol with an unsaturated dicarboxylic acid to produce an unsaturated polyester. This ester can then be admixed with a vinyl compound which enhances cross-linking among the individual linear polymer chains. The final products have variously been called polyester resins, contact resins (because of the low molding pressure needed), and low pressure laminating resins.

For convenience herein the polyester reaction product is called a polyenester to indicate its unsaturated nature.

The material after cross-linking with a vinyl material such as styrene is herein referred to as a vinyl-modified polyenester resin.

Polyenester resins of the conventional phthalic acid-maleic acid-polyol-styrene type are commonly employed in the manufacture of glass fiber-reinforced corrugated sheets.

A pure polyenester resin or a vinyl-modified polyenester resin is too brittle for many uses. Tougher and more flexible resins may be obtained by spacing the double bonds in the polyenester molecule farther apart. This can be accomplished by using an acid, called a modifying acid herein, such as phthalic, adipic, or sebacic acids, in lieu of some of the maleic acid.

The sheets produced from such resins are translucent, but the difference in refractive indices, between the glass and the cured or polymerized resin is such that glass fibers are distinctly apparent, even when they are perfectly impregnated with the resin. The result is that light transmission is reduced and the sheets are only slightly transparent.

The glass fibers will be least noticeable when the cured or polymerized resin has the same refractive index. The refractive index of the glass fibers to be embedded in the finished sheets is determined by immersing samples of a glass fiber mass into liquid having various refractive indices. The fibers are found to have a refractive index ranging generally between 1.550 and 1.552. The refractive index of the resin substantially increases during the polymerization generally by about 0.023 to about 0.025. Accordingly, it is necessary to adjust the refractive index of the unpolymerized resin. Therefore, for the closest match of refractive index of the polymer and the glass fibers, the respective index of the starting uncured resin should be adjusted to a value in the range of from about 1.525 to about 1.529.

Methyl methacrylate has been used in the past for increasing the transparency of sheets of glass fiber-reinforced resins. When such methyl methacrylate is added to the starting monomeric styrene feed in suitable proportions, it allows a substantial increase in the transparency.

This invention provides unpolymerized or uncured resins capable of being made into glass fiber-reinforced sheets with high light transmission.

The invention provides glass fiber-reinforced polyenester resin materials of superior light transmission.

Further and more specific objects, features, and advantages will clearly appear from the detailed description given below.

Briefly, it has been found that itaconic acid esters can be used to prepare modified polyenester resins which will produce sheets of glass fiber-reinforced material having high light transmission when cured. Such itaconic acid esters can be used to adjust the refractive index of the resin and of the finished sheet. These itaconic acid ester-containing polymerizable compositions comprise a mixture of conventional polyenester with sufficient itaconic acid ester to make the refractive index of the polyenester substantially equal to the refractive index of the glass fibers embedded in the resin. Such polymerizable compositions can be used to prepare glass-fiber reinforced cured or polymerized resins of polyenesters with the refractive index of the resin substantially equal to the refractive index of the embedded glass fibers.

The preferred finished products of this invention accordingly comprises a polymerized polyenester, copolymerized styrene and itaconic acid ester, and glass fibers. These finished products are prepared from a polymerizable composition comprising a polyenester, styrene, and itaconic acid ester, and glass fibers.

It has also been found in accordance with the invention that when itaconates are added to the resin to increase the transparency of glass fiber-reinforced sheets, the increase of transparency is accompanied by a dichroism. Dichroism is that property which gives the sheets a shimmer or iridescence which varies, according to the angle of incidence of the reflected light, from violet through blue to yellow. Accordingly, it has been found that the addition of slight amounts of certain substances decreases the dichroism of the finished sheets and simultaneously increases the transparency of the glass fiber-reinforced sheets. Generally the substances which are added to reduce dichroism are esters, ketones, and sulfones.

The invention comprises novel compositions and component mixtures comprised in such compositions and the novel products, specific embodiments of which are described herein after by way of example and in accordance with which it is presently preferred to practice the invention.

Unless otherwise indicated, all proportions, parts, and percentages given herein are by weight.

It will be understood that the polyenesters which can be used in this invention are those produced from a polyol or polyhydroxy compound, an olefinically unsaturated dicarboxylic substance, and a modifying dicarboxylic substance. To this polyenester composition is added a vinyl monomer to enhance cross-linking. Examples of preferred polyol materials are glycols such as ethylene glycol, diethylene glycol, and propylene glycol. The olefinically unsaturated dicarboxylic substances are dicarboxylic acids or anhydrides thereof. Preferred dicarboxylic materials are maleic acid and maleic anhydride.

The modifying dicarboxylic substances are preferably dicarboxylic acids without ethylenic or acetylenic unsaturation. Examples of preferred modifying dicarboxylic substances are phthalic acids and derivatives thereof such as anhydrides. These include phthalic acid, terephthalic acid, endo-dichloromethylenetetrachlorophthalic acid, and the like and anhydrides thereof. The cross-linking agent, as mentioned above, is preferably a vinyl monomer, such as styrene, vinyl toluene and the like.

For curing the resin there is preferably added thereto a polymerization catalyst and a promoter. The preferred polymerization catalysts are organic peroxides, such as methyl ethyl ketone peroxide and the like. The promoters are preferably cobalt salts of high-boiling organic carboxylic acids. A preferred promoter is cobalt octoate.

The itaconic acid esters employed in the practice of this invention are preferably the lower alkyl itaconic acid esters. It is preferred to utilize lower itaconic acid esters of alcohols containing from one to about six carbon atoms. Examples of such preferred esters are methyl, ethyl, propyl, and butyl itaconates. It is generally preferred with ordinary polyester resins that the itaconic acid ester comprise from about 10 to about 50% by weight of the mixture of polyester and styrene employed.

It is preferred to utilize relatively small quantities of the materials which reduce dichroism in the finished plastic sheets. Thus, it has been found that from about 0.1% to about 3% of dichroism-reducing substances generally produce a significant diminution of dichroism and an increase in transparency. As mentioned above, the dichroism-reducers of this invention are esters, ketones, and sulfones. The esters used to reduce dichroism are generally esters of lower alkyl acids with lower alkyl alcohols. A preferred ester is ethyl acetate. Lower alkyl ketones are preferred ketones for reducing dichroism. A preferred ketonic material is acetone. The sulfones used for dichroism reduction are lower alkyl sulfones, preferably dimethyl sulfone.

It has been found that the use of the itaconic acid esters of this invention in the preparation of vinyl-modified polyesters provides polymerized resins which are more stable to light and heat than are ordinary vinyl-modified polyester resins which contain styrene alone. Moreover, the adhesive properties of the resin are improved. A further advantage of the itaconic acid ester-containing compositions of this invention is that it is possible to polymerize larger masses of resin without the risk of cracking. This freedom from cracking and the superior adhesion of the compositions of this invention are especially valuable where various objects or articles are to be included in the mass of polymerized resin.

The following examples are given to illustrate the practice of this invention and it is to be understood that the invention is not to be restricted thereto except as indicated by the appended claims.

EXAMPLE I

For comparison a composition (without itaconate) is prepared as follows:

*Experiment 1.*—A polyenester composition is prepared by admixing maleic anhydride, phthalic anhydride, and propylene glycol. The polyenester mixture is diluted with 34% of styrene.

To this polymerizable polyester-styrene mixture are added 1.2% of 50% methyl ethyl ketone peroxide catalyst and 0.3% of a cobalt octoate catalyst containing 3% cobalt. A mass of glass fibers is then impregnated with the polymerizable mixture between two sheets of transparent regenerated cellulose, and the mixture is cured for three hours at 80° C. to polymerize it.

Three similar batches of material are prepared and cured adding, in Experiment 2 below, methyl itaconate; in Experiment 3 below, methyl itaconate and ethyl acetate; and in Experiment 4 below, methyl itaconate and dimethyl sulfone, in the amounts indicated in Table I.

The samples are evaluated for transparency by measuring the transmission of directed monochromatic light with a spectrophotometer. In order to avoid losses due to Fresnel reflection and aberrations resulting from lack of smoothness, the samples are measured in a glass vessel having parallel walls and filled with a liquid having a refractive index of approximately 1.551.

The results of these experiments are shown in the following table:

TABLE I

| Experiment No. | Formula | Light trans, mission percent |
|---|---|---|
| 1 | Polyenester diluted with 34% of styrene, no additive. | 22 |
| 2 | Polyenester diluted with 34% of styrene, 100 parts; methyl itaconate, 16 parts. | 80.2 |
| 3 | Polyenester diluted with 34% of styrene, 100 parts; Methyl itaconate, 16 parts; Ethyl acetate, 2 parts. | 93.2 |
| 4 | Polyenester diluted with 34% of styrene, 100 parts; Methyl itaconate, 16 parts; Dimethyl sulfone, 1 part. | 91.5 |

From the foregoing results it can be seen that the light transmission is increased by a factor greater than three through the use of the itaconate esters according to this invention.

EXAMPLE II

A polyenester composition is prepared by admixing maleic anhydride, isophthalic acid, and propylene glycol. This polyenester is then diluted with 44% of styrene. To 100 parts of the vinyl-modified polyenester polymerizable material is added 15 parts of methyl itaconate and 5 parts of acetone.

Methyl ethyl ketone peroxide catalyst and cobalt octoate promoter are added to the material and it is mixed with glass fibers and polymerized, and the light transmission is measured, all as in Example I.

The light transmission of the glass fiber-reinforced polymerized resin is found to be 87%.

EXAMPLE III

A flame resistant polyenester is prepared by admixing maleic anhydride, endo - dichloromethylenetetrachlorophthalic acid, and propylene glycol. This polyenester material is diluted with 34% of styrene. To 100 parts of this vinyl-modified polyenester are added 16 parts of methyl itaconate and 2 parts of ethyl acetate.

Catalyst and promoter are added to the vinyl-modified polyenester, and it is used to impregnate glass fibers and then polymerized.

The light transmission, measured as in Example I, is found to be 93%.

EXAMPLE IV

To the polyenester of Experiment 3 in Example I is added 10 parts of n-butyl itaconate, instead of 16 parts of methyl itaconate, and 2 parts of ethyl acetate. When the transmission of this material is measured after the treatment of, and according to the procedure of, Example I, it is found to be 80%.

What is claimed is:
1. A polymerizable composition comprising:
  (1) styrene,
  (2) a polyenester obtained by reaction of propylene glycol, maleic anhydride, and a phthalic acid or anhydride, said polyene ester having a refractive index of from about 1.525 to 1.529,
  (3) a lower alkyl itaconic acid ester in which the alkyl groups contain from 1 to 6 carbon atoms,
  (4) from about 0.1 to 0.3% by weight of a dichroism reducer selected from the group consisting of lower alkyl ketones, lower alkyl sulfones and esters of lower alkyl acids and alcohols, and
  (5) glass fibers having a refractive index of from about 1.550 to 1.552;

the itaconic acid ester being present in sufficient quantity so that upon polymerization of the polymerizable composition the refractive index of the solid resin produced is substantially the same as the refractive index of the glass fibers.

2. A composition as in claim 1 wherein the polyenester is obtained by reaction of propylene glycol, maleic anhydride and phthalic anhydride.

3. A composition as in claim 1 wherein the polyenester is obtained by reaction of propylene glycol, maleic anhydride and isophthalic acid.

4. A composition as in claim 2 wherein the polyenester is obtained by reaction between propylene glycol, maleic anhydride and endo-dichloromethylenetetrachloro phthalic acid.

5. A solid resin composition having a refractive index of from about 1.550 to 1.552, said resin composition comprising a vinyl modified polyenester obtained by reacting styrene with a polyenester in the presence of:
 (1) a lower alkyl itaconic acid ester in which the alkyl groups contain from 1 to 6 carbon atoms,
 (2) a dichroism reducer selected from the group consisting of lower alkyl ketones, lower alkyl sulfones and esters of lower alkyl acids and alcohols, said lower alkyl groups containing from 1 to 6 carbon atoms, and
 (3) glass fibers having a refractive index of from about 1.550 to 1.552;
the said polyenester having a refractive index of from about 1.525 to 1.529 and being formed by reaction between propylene glycol, maleic anhydride and a phthalic acid or anhydride.

6. A composition as in claim 5 wherein the polyenester is obtained by reaction of propylene glycol, maleic anhydride and phthalic anhydride.

7. A composition as in claim 5 wherein the polyenester is obtained by reaction of propylene glycol, maleic anhydride and isophthalic acid.

8. A composition as in claim 5 wherein the polyenester is obtained by reaction of propylene glycol, maleic anhydride and endo-dichloromethylenetetrachloro phthalic acid.

References Cited

UNITED STATES PATENTS

| | | | |
|---|---|---|---|
| 2,944,994 | 7/1960 | Singleton et al. | 260—861 |
| 3,225,117 | 12/1965 | Harper | 260—872 |

FOREIGN PATENTS 975,876 11/1964 Great Britain.

OTHER REFERENCES

Schildknecht: Vinyl and Related Polymers, TP986V-48S3C8, John Wiley & Sons, New York, p. 308 (1960).

Sloan: "Methyl Acrylate as a Monomer in Glass Fibre Reinforced Polyester Laminates," SPE Journal, 1123–1127 (1960), 62CA 5401f (1965).

ALLAN LIEBERMAN, Primary Examiner

L. T. JACOBS, Assistant Examiner